March 3, 1959 H. W. KLEIST 2,875,595
EUTECTIC BLOWER UNIT FOR REFRIGERATING SPACES
Original Filed May 28, 1954 6 Sheets-Sheet 1
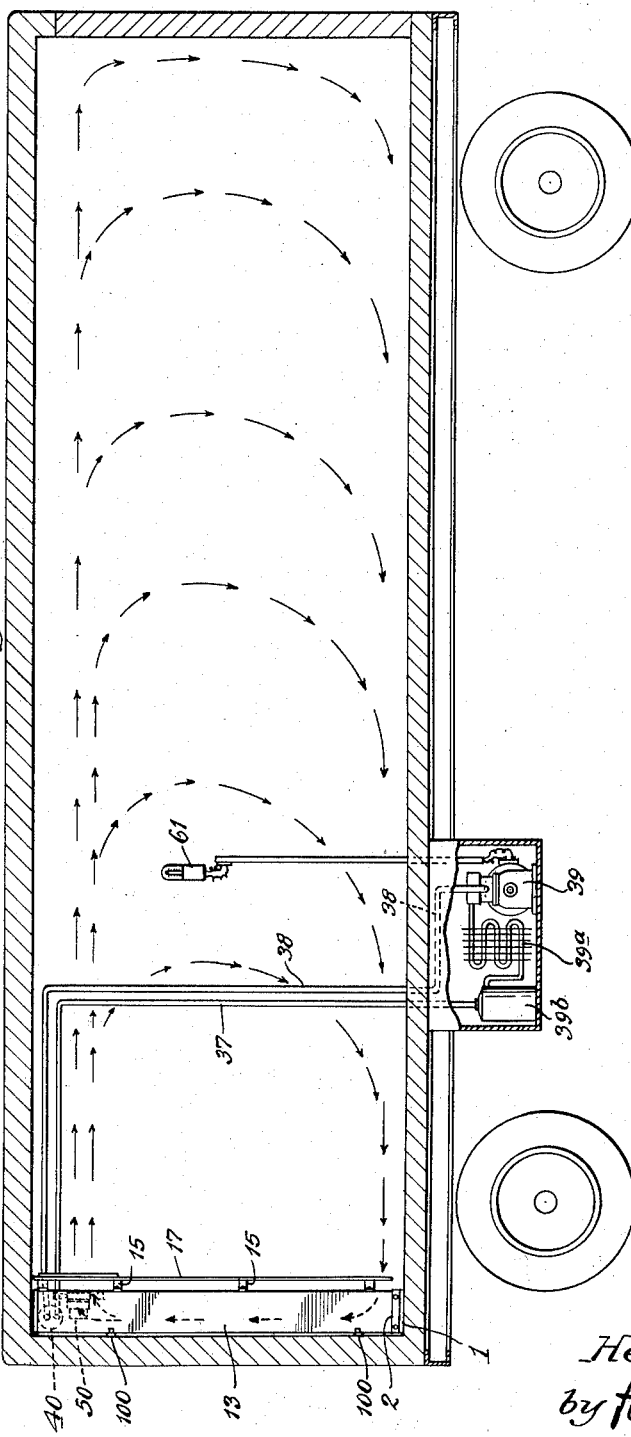
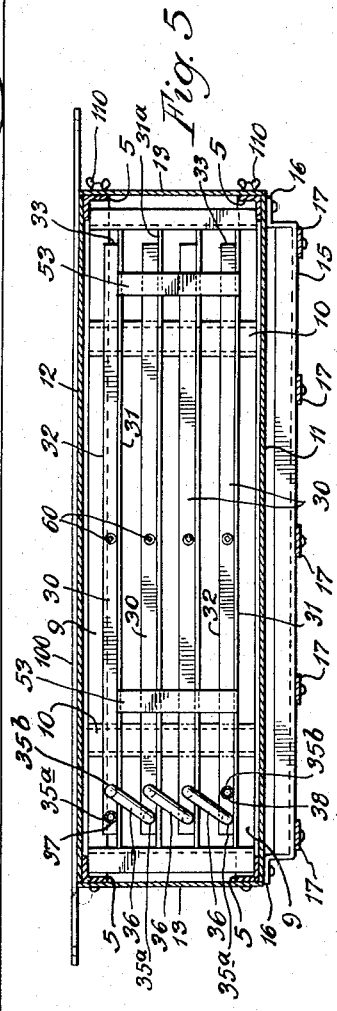
Inventor
Herman W. Kleist
by Parker & Carter
Attorneys

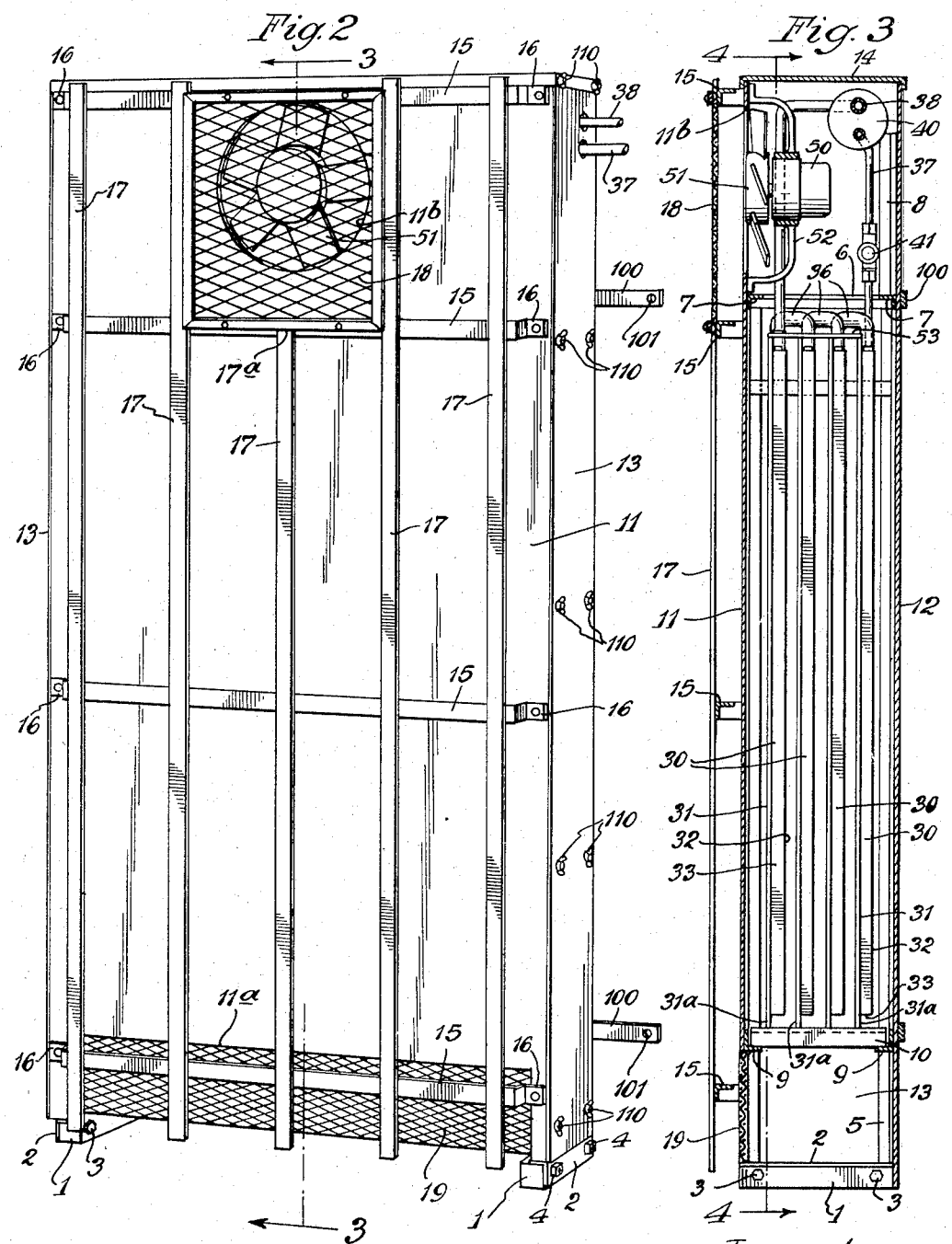

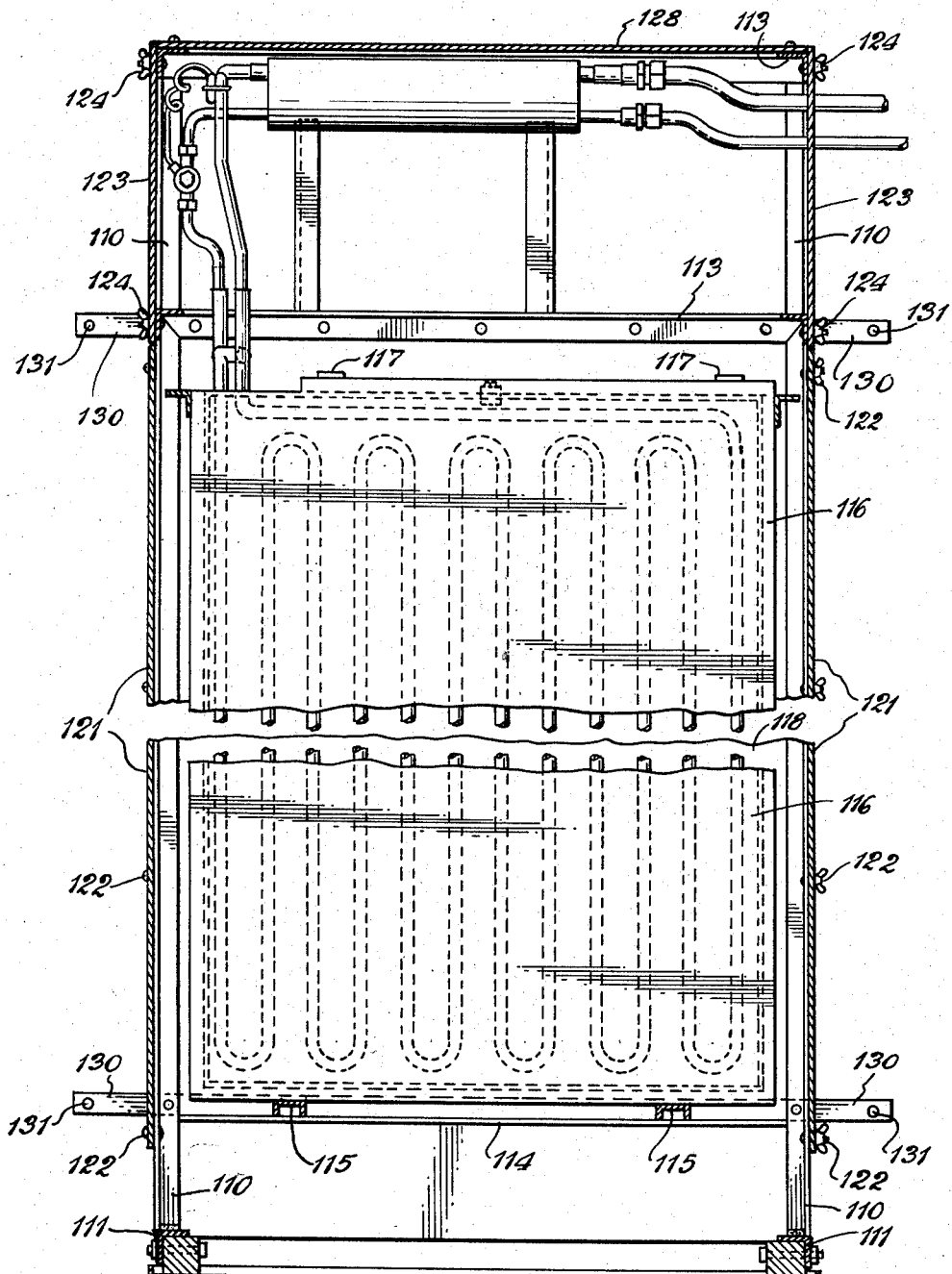

March 3, 1959     H. W. KLEIST     2,875,595
EUTECTIC BLOWER UNIT FOR REFRIGERATING SPACES
Original Filed May 28, 1954     6 Sheets-Sheet 6
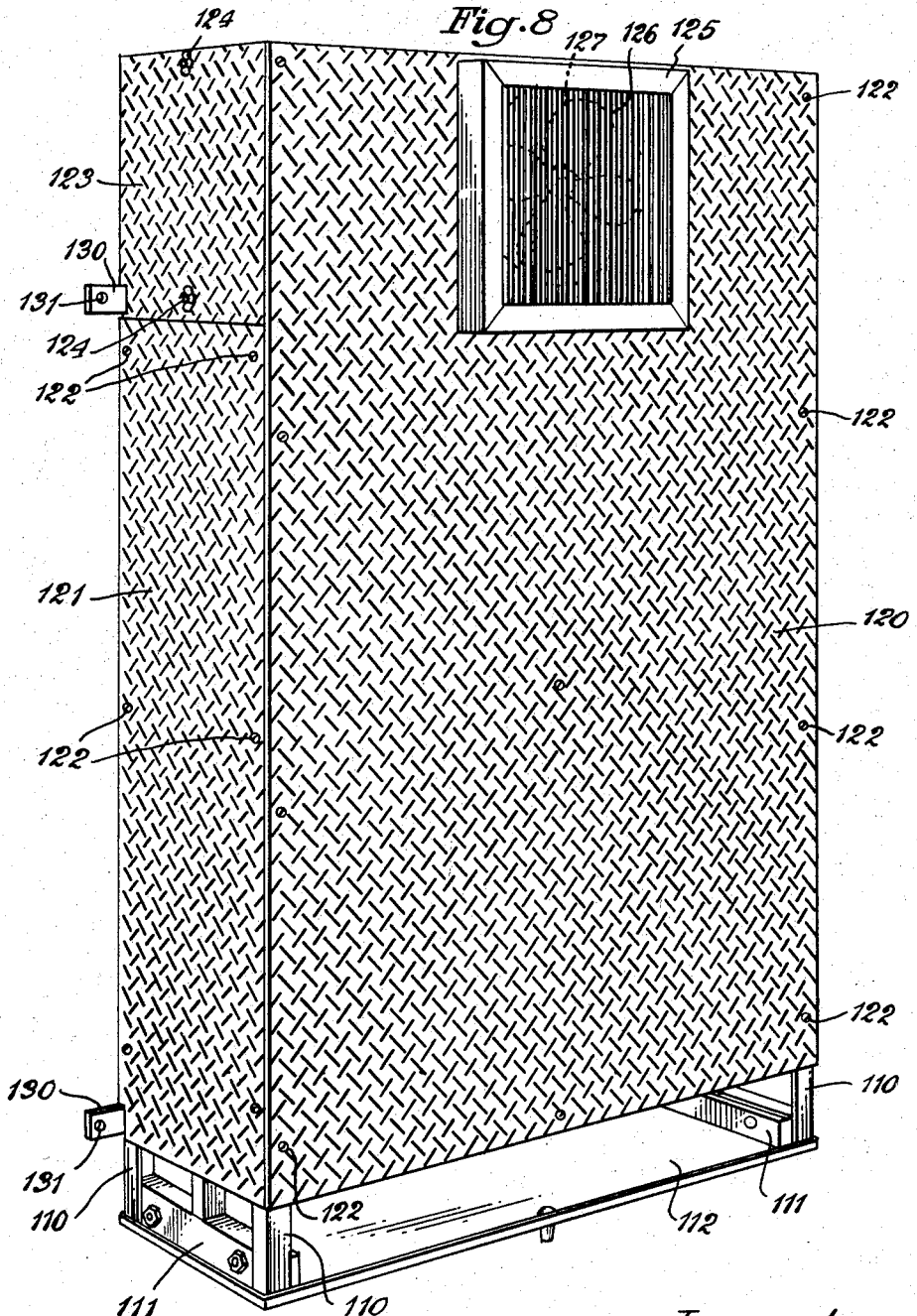
Inventor
Herman W. Kleist
by Parker & Carter
Attorneys United States Patent Office 2,875,595
Patented Mar. 3, 1959

2,875,595
EUTECTIC BLOWER UNIT FOR REFRIGERATING SPACES

Herman W. Kleist, Chicago, Ill., assignor to Dole Refrigerating Company, Chicago, Ill., a corporation of Illinois Continuation of application Serial No. 433,146, May 28, 1954. This application August 19, 1957, Serial No. 678,948

4 Claims. (Cl. 62—419)

My invention relates to an improvement in cooling units, and has for one purpose to provide a cooling unit adaptable for use in vehicles.

Another purpose is to provide a substantially complete and self-contained refrigeration or air cooling unit for use in storage spaces and freight cars, trucks, trailers, and the like.

Another purpose is to provide a substantially complete self-contained cooling unit which may be unitarily applied to and secured within a room, vehicle, trailer, truck, or the like.

Another purpose is to provide such a unit which may be quickly and readily installed in whatever space is to be cooled and may be readily and removably applied to or secured in relation to the wall of such a space.

Another purpose is to provide such a unit in which provision is made for differential frost formation at different parts of the unit.

Another purpose is to provide such a structure in which a plurality of refrigeration plates are employed defining passages of varying capacity, or depth, whereby allowance is made for differential frosting of the interplate spaces.

Other purposes will appear from time to time in the course of the specification and claims.

The present application is a continuation of my application, Serial No. 433,146, filed in the United States Patent Office on May 28, 1954 and a continuation-in-part of application Serial No. 330,671, both now abandoned.

I illustrate my invention more or less diagrammatically in the accompanying drawings wherein:

Figure 1 is a longitudinal vertical section through a trailer or truck, illustrating my unit in place;

Figure 2 is a perspective view of the unit on an enlarged scale;

Figure 3 is a section on the line 3—3 of Figure 2;

Figure 5 is a section on the line 5—5 of Figure 4;

Figure 7 is a vertical central section of Figure 6; and

Figure 8 is a perspective exterior view.

Like parts are indicated by like symbols throughout the specification and drawings.

Figure 4:
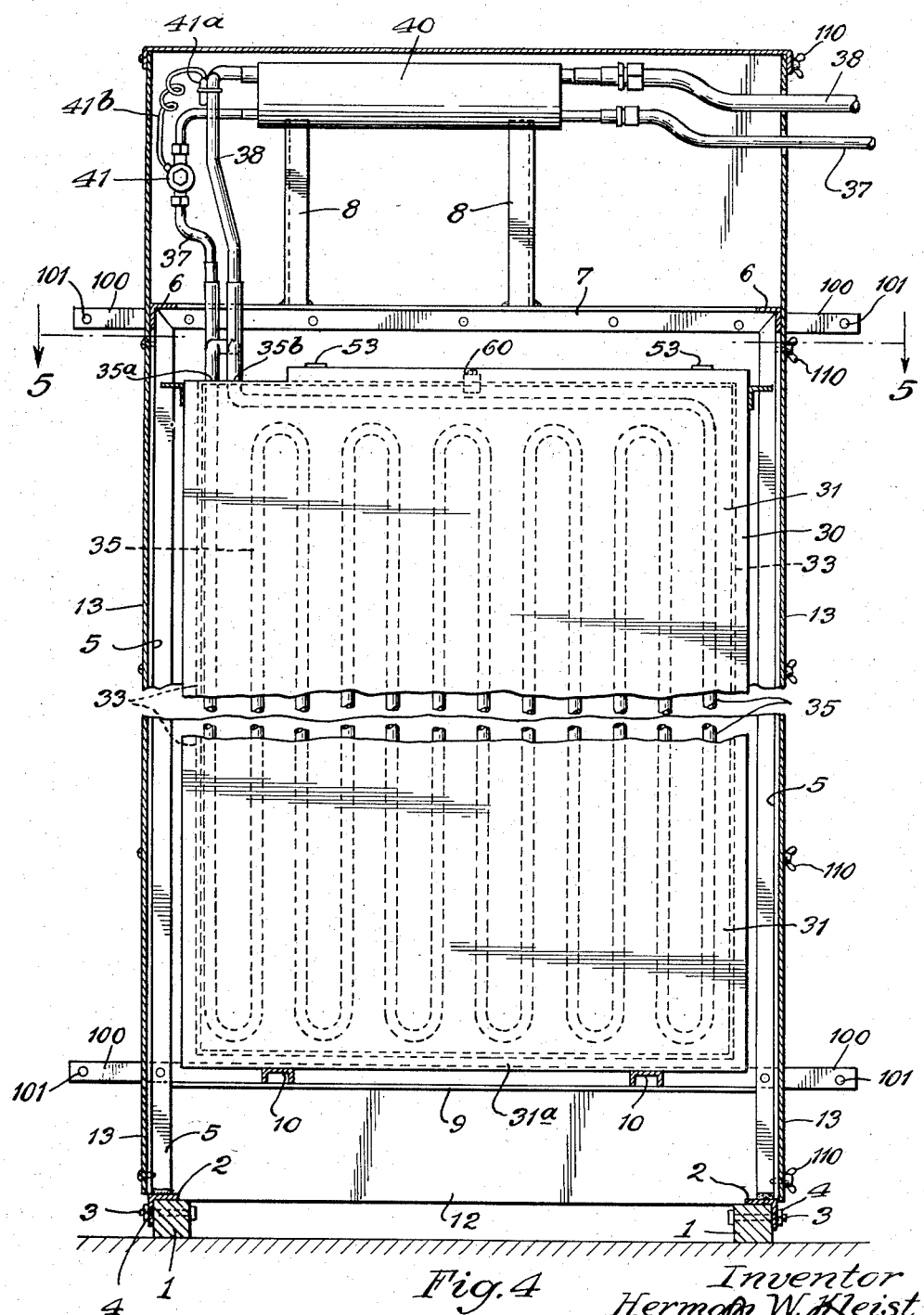
Figure 4 is a section on the line 4—4 of Figure 3.

Referring to the drawings, 1, 1 illustrates any suitable base elements formed and adapted to contact a supporting surface. They may be of wood or any other suitable material. Positioned upon and secured to the elements 1, 1, I illustrate angle irons 2. They may, for example, be removably held in position by bolts 3 and nuts 4. Upwardly extending from and suitably secured to the angle irons 2 I illustrate vertical structural members 5, which may, for example, also be angle irons. These vertical members or supports 5 are shown as connected at their upper ends by horizontal structural elements or angle irons 6. Additional cross-members or angle irons 7 connect the upper ends of the structural members 5, one of them carrying vertical supports or angle members 8, the purpose of which will later appear. The opposite pairs of structural members 5 are connected adjacent their bottoms by suitable frame members 9, the members 9 being shown as connected by and supporting cross-members or channels 10, the purpose of which will later appear.

The framework thus formed serves as a unitary frame or support which is shown as receiving front, rear and side closures or sheets to produce a housing having upper and lower air openings. I illustrate, for example, a front plate or sheet 11, a rear plate or sheet 12, and side plates or sheets 13. The front sheet 11 is shown as terminating above the floor level as at 11a. It is also provided with a front opening as at 11b. A top sheet 14 is illustrated as closing the top of the housing thus formed. It will be observed that the front, rear and side sheets 11, 12 and 13 all extend substantially above the upper cross-members 7 and enclose a space thereabove, this space being closed by the top sheet 14 and being forwardly open through the aperture 11b in the front sheet 11. A protecting or reinforcing structure is positioned forwardly of the plate 11. It includes a plurality of cross-bars 15 having rearwardly offset end flanges 16 opposed to the sheet 11 and to the vertical members 5 immediately to the rear of the sheet 11. Vertical strips or protecting members 17 are secured to the cross-bars 15, and a reinforcing or protecting grid is thus formed. The central member 17 is shown as terminating at 17a near or just below the aperture 11b. The reinforcing structure thus formed is shown as carrying a grid or netting 18, which protects the opening 11b. A similar grid or netting 19 closes the space below the lower edge 11a of the front sheet 11.

It will thus appear that a front bottom aperture or air inlet is provided, protected by the grid or netting 19, through which air can be inwardly drawn for upward passage. The air may escape through the upwardly located forward discharge aperture 11b. As will later appear, the purpose for drawing the air upwardly through the housing formed by the above-mentioned sheets is to cool the air, and thus to maintain a suitably low temperature in a storage space, such as the interior of a vehicle. In order to cool the air, I provide a plurality of heat exchange members in the form of evaporator plates, each plate having therewithin a suitable refrigerating coil. Referring, for example, to Figures 3 and 4, I illustrate a plurality of plates arranged in parallel, each of the plates, indicated at 30, having parallel plane side walls 31 and 32, which will be understood to be sealed together about their edges in a gas-tight relationship. The plate walls 31 are shown as having margins 31a extending outwardly beyond the contour of the opposite plate walls 32, the walls 31 and 32 being connected by side portions 33. Within each plate so formed I position an evaporator coil or pipe through which a suitable refrigerant may pass. I prefer to employ a volatile refrigerant and suitable cycling means therefor. Referring, for example, to Figure 4, 35 illustrates a coil having its entry point into the plate at 35a and its exit point at 35b. It will be observed that the entry and the exit points are closely adjacent, and, for convenience, are located at an upper corner of the plate. As shown in Figure 3, I illustrate, as a convenient arrangement, a series connection between adjacent plates, in which connectors 36 connect the coil outlet of one pipe to the coil inlet of the next plate. These inlets and outlets of the respective plates, and thus the connectors 36, are all conveniently adjacent. 37 is a supply pipe or duct extending from the pressure side of any suitable cycling assembly. 38 is the low pressure return line to the suction side of the compressor. The compressor, indicated at 39, is associated with any suitable condenser 39a and receiver 39b, it being understood, of course, that the details of the cycling system do not, of themselves, form part of the present invention. The pipes 37 and 38 may pass through any suitable heat exchange unit 40, and the pipe 37 is provided with an suitable reduction valve or reduction unit 41. The pipe 37 extends to the inlet of the coil 35 of the first of the series of plates illustrated, for example, in Figures 3 and 5. The low pressure pipe or return pipe 38 is connected to the discharge of the coil of the last in the series of plates.

It will be observed that the plate side walls 31 and 32 are generally plane and generally parallel, and that the entire series of plates is held in vertical position, being shown as supported by and secured at the bottom to the cross-members 10 and centered within and suitably spaced within the above-described supporting structure. At the top, the cooling plates may be spaced apart by suitable bars or braces 53. The space between adjacent plates is substantially uniform, and space is provided between the outer surfaces of the end plates and the inner surfaces of the front and rear plates or walls 11 and 12 of the housing. Thus I provide a series of parallel, flat-sided, shallow air passages between opposed parallel cooled surfaces, for the air to flow from the inlet to the outlet opening of the housing.

In order to cause the passage of air upwardly through these shallow, uniform, flat-walled passages thus provided, I may employ any suitable fan or air-propelling structure. I illustrate, for example, a motor 50 which drives a fan 51, the motor 50 being supported on any suitable support or spider 52 within the upper space in the housing. This arrangement will be clear from Figure 3. A suitable actuating circuit is provided for the fan. When the fan is operated, air cooled by its upward passage through the plates will be directed outwardly through the grid 18. The air to be cooled will be drawn inwardly through the grid 19.

Figure 6:
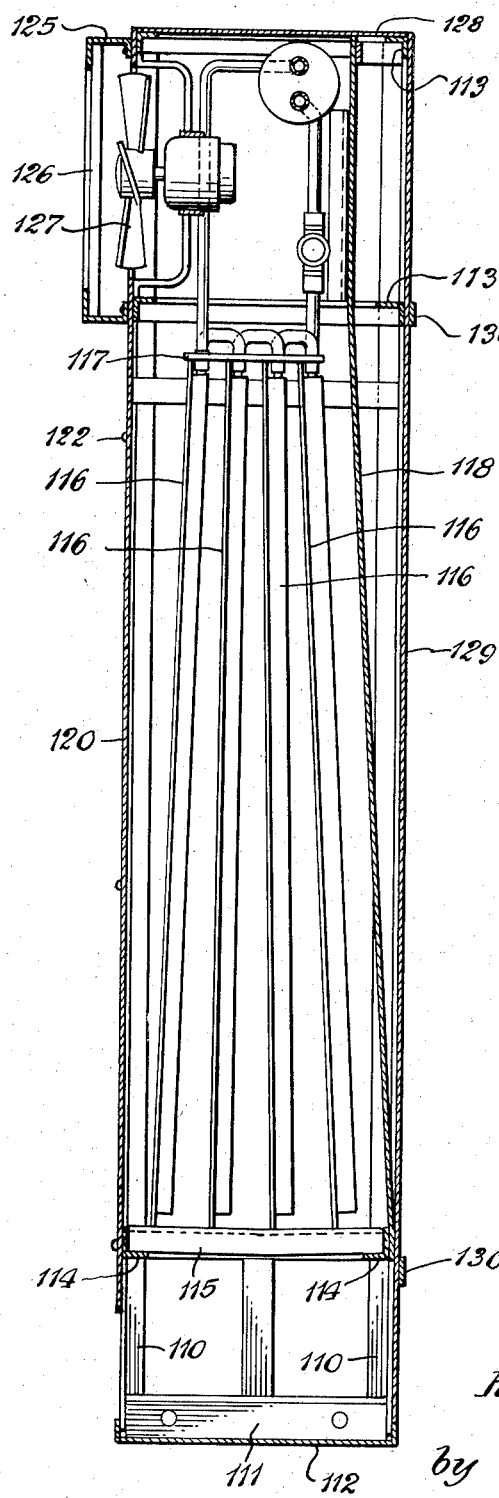
Figure 6 is a vertical section through a variant form of my unit.

Referring to the form of Figure 6 and following, I illustrate a unit differentiating somewhat from that of Figures 1 to 5. I employ vertical corner frame members 110 resting at their lower ends on any suitable cross supports 111, which in turn are shown as resting upon a bottom plate 112. The corner frame members 110 may be connected at their upper ends by any suitable transverse frame members 113 and may be connected adjacent but above their lower ends by any suitable cross connections 114. The lower transverse connections 114 are shown as carrying cross pieces or channels 115 upon which a plurality of plates 116 are supported. These plates may be identical with the plates illustrated in Figures 3, 4 and 5 and will not be further described in detail. However, the plates are spaced apart by a distance which increases progressively downwardly from the upper to the lower edges of the plate. Any suitable top spacing supporting structure 117 may be employed. I desired, a supplemental outer sheet 118 may be employed outwardly spaced from the adjacent plate 116. The connections between the plates and the connections between the plates and the cycling system may be identical with those shown in the form of Figures 1 to 5.

I find it advantageous to employ an outer shell for my unit of relatively thick plate. I illustrate, for example in Figure 8, a front plate 120 which may be screwed, bolted or otherwise secured to the corner supports or structural members 110 and to the cross pieces 113, 114. Similarly, I may employ side or edge plates, as shown at 121 in Figure 8. These plates are preferably readily removable. They may, for example, be secured to the corner elements 110 as by screws 122. Thus, plate 121 may be readily removed for service access to the space between the plates 116. Since there may be more frequent necessity of access to the upper part of the interior than to the lower. I illustrate an upper removable closure plate 123 held removably in position by thumb nuts 124. It will be understood, of course, that, if desired, the side or edge plate 121 may be similarly held by thumb nuts. 125 indicates a frame surrounding a fan aperture or air outlet and provided with any suitable netting or louvers 126. It will be understood that the fan 127, when suitably electrically connected with a source of power, will draw air upwardly between the plates 116 and discharge it outwardly through the aperture of the frame 125. The top of the housing is closed by any suitable top closure 128 and a suitable rear plate 129 is provided, which may either extend to the floor, as indicated in Figure 6, or may stop short of the floor, if desired. The unit may be secured to a wall by any suitable cross-pieces or flanges 130, apertured at 131, to receive any suitable securing means. One or all of the housing plates terminate short of the floor or above the bottom plate 112, whereby air can flow freely into the space below the cold plates 116 and may be drawn upwardly therethrough.

It will be realized that whereas I have shown a practical and operative device, nevertheless, many changes may be made in size, shape, number and disposition of parts without departing from the spirit of my invention. I therefore wish my description and drawings to be taken in a broad sense as illustrative or diagrammatic, rather than as limiting me to my specific showing herein. It will be understood that whereas I may employ any suitable type of heat exchange members, I find plane walled plates of the type herein shown to be preferable.

I also find it preferable, under some circumstances, to employ plates in which the space about the coil 35 and between the walls 31 and 32 it as least partially filled by a suitable eutectic.

It will be noted that I have provided filling means for the plates in the form of a valve 60 from which the air within the plates may be partially evacuated after an initially liquid eutectic has been admitted. It will be understood that when the cycling unit is operated, the cycling may be continued until the eutectic in the plates is frozen solid, thus constituting a reservoir or supply of cooling potential. It will be understood also that I may employ any suitable control means. As a matter of illustration, I show a pressure reduction valve 41 which may be actuated, for example, by a bulb 41a and its appropriate duct 41b, filled with a suitable fluid, the bulb 41a being secured to the return pipe 38. It will be understood, of course, that any suitable thermostat or control 61 for the cycling unit may be employed, depending upon the needs of the particular vehicle with which my unit is used. For example, as shown in Figure 1, any suitable thermostat 61 may be suitably connected to control the motor component of the compressor 39.

The use and operation of the invention are as follows:

I provide a simple, self-contained unit which may easily be assembled and shipped as a unit. It may easily be applied to the wall of a room or to the end of a car. I provide, for example, straps or lugs 100 which may be apertured, as at 101, to receive any suitable bolts or securing means. The members 100 or 130 are shown as extending across the rear plate of the structure or housing, one of them being located near the top of the unit and the other near the bottom. This is merely an example of a suitable means whereby the unit can be quickly and easily secured in position by means which permit equally quick and easy removal when need occurs.

The plates are arranged in a group within the housing formed by the side and end walls, and the plates may have an identical or similar internal evaporator duct. In any event, the entry and exit passages of the ducts are preferably arranged adjacent, so that the connectors 36 and the connections to the high and low pressure ducts 37 and 38 are all adjacent, and are conveniently located near the top of the housing. It will be understood that the top wall or cover 14 may be made readily removable. Also, either of the side walls 13 may be made readily removable. I illustrate, for example, in Figure 5, securing screws 109. By providing such a removable wall or walls an operator can easily have access to the interior of the housing, and he may, for example, remove frost from the plate surfaces. Since the surfaces are plane and parallel, the insertion of a frost removing tool is easy and simple, and the frost can be readily removed from the space below the lower edges of the plates.

In the form of Figure 6 and following I arrange the plates 116 in such fashion that the space between the plates, while uniform when measured in horizontal planes, increases from top to bottom of the plates. I find this under some circumstances advantageous since, in practice, frost tends to form more rapidly and more thickly at the lower edges of the plate. By providing a somewhat wider interplate space at the lower end of the bank of plates I render damaging or clogging frosting correspondingly less likely. I also find that having the plates converge upwardly in the direction of air flow causes what I may call a venturi effect in which the acceleration of the air flow tends to inhibit or greatly reduce the formation of frost on the upper parts of the plate. This, in connection with the wider opening at the bottom of the plate, makes frosting of the interplate spaces less likely. It will be understood, of course, that in both forms of my invention the operator may readily remove the side or edge plates and have quick and easy access to the interplate structure, for removing the frost by any suitable tool. The fact that the surfaces of the plates are smooth renders the mechanical removal of the frost simple and easy.

In the use of my unit it will be understood that, on short runs, the eutectic plates, if the eutectic is frozen at or before the beginning of the run, may need no cycling at all. On the other hand, on a long run, intermittent cycling may be necessary, and the timing of the cycling may be controlled in response to temperature conditions, as by the thermostat 61. It will be understood, of course, that the compressor-condenser unit need not be on the vehicle itself. On short runs, the vehicle may be positioned near a fixed compressor-condenser unit, and the cycling may then take place in the usual manner. However, on long runs, it is advantageous to employ a cycling unit which is secured to or carried adjacent the vehicle.

It will be further understood that whereas I may find it advantageous to employ a cycling unit, as shown in Figure 1, in or supported on the vehicle, I may also, under some circumstances, find it more advantageous to employ a fixed cycling unit to which the pipes 37 and 38 may be detachably connected. Thus, the plates may be cooled to the point that the eutectic is partially or completely frozen. The vehicle, truck, car, or the like, may then be employed for a substantial period, as the eutectic will constitute a stand-by of refrigeration potential which may be effective for many hours.

I claim:

1. In a unitarily removable refrigerating unit for cooling air in trucks, vehicles and the like, a housing and supporting structure including interior structural elements and top and side walls secured thereto, a plurality of refrigerating plates supported within said walls on said structural elements and terminating at their upper ends below the top of the housing and at their lower ends above the bottom of the structural elements, whereby a plenum space is provided above and below the plates, each said plate having a smooth, plane, unrestricted face at each side thereof, said plates defining between them relatively restricted air passages of substantially uniform depth substantially from side edge to side edge of the plates, the plates being upwardly convergent, whereby the interplate spaces are upwardly restricted toward their upper ends, each plate having therein an evaporator coil with an inlet and an outlet duct, said inlet and outlet ducts being located at and above the upper edges of the plates and being arranged and adapted to connect the plates in a refrigerant cycling system, the upper plenum space having a lateral air outlet aperture at a level above the plates, a fan mounted within the housing and above the plates, in general alignment with said air outlet, terminal lengths of high pressure and low pressure ducts adapted for connection in a compressor-condenser assembly, said terminal lengths being positioned in the housing, and means for securing the unit in relation to the side wall of a vehicle, the lower plenum space being in communication with the space to be cooled, whereby air is permitted to flow therethrough and upwardly between the plates.

2. In a unitarily removable refrigerating unit for cooling air in trucks, vehicles and the like, a housing and a supporting structure therefor, said structure including interior structural elements including upright members and transverse connecting members, said housing including walls removably secured to said supporting structure, said walls terminating substantially above the floor level upon which said supporting structure rests, a plurality of refrigerating plates supported within said walls on transversely extending structural elements, said plates terminating at their upper ends substantially below the top of the housing and at their lower ends above the bottom of the structural elements, whereby a plenum space is provided above and below the plates, each said plate having a smooth, plane, unrestricted face at each side thereof, said plates defining, between them, relatively restricted air passages of substantially uniform depth substantially from side edge to side edge of the plates, each plate having therein an evaporator coil with an inlet and an outlet duct, said inlet and outlet ducts being located in the upper plenum space and being arranged and adapted to connect the plates, in series, in a refrigerant cycling system, the upper plenum space having a lateral air outlet aperture at a level above the plates, and a fan mounted within the housing and above the plates, in general alignment with the air outlet, a terminal length of a high pressure duct and a terminal length of a low pressure duct adapted for connection in a compressor-condenser assembly, said terminal lengths being positioned in the upper plenum space, the said high pressure duct extending to the inlet duct of an end plate in said series of plates, said low pressure duct extending from the outlet duct of the opposite end plate in said series, a common pressure reduction means for said series located in said high pressure duct and a heat exchange element associated with both the high pressure and the low pressure ducts, whereby the low pressure duct is subjected to heat of the high pressure duct, and means for removably securing the unit in relation to a wall of a space to be refrigerated.

3. The structure of claim 2 characterized in that the common pressure reduction means is located in the upper plenum chamber.

4. The structure of claim 2 characterized in that the common pressure reduction means and the heat exchange element are located in the upper plenum chamber.

References Cited in the file of this patent

UNITED STATES PATENTS

| | | |
|---|---|---|
| 2,063,646 | Whitesel | Dec. 8, 1936 |
| 2,097,851 | Wenzel | Nov. 2, 1937 |
| 2,107,088 | Scott et al. | Feb. 1, 1938 |
| 2,150,224 | Hull | Mar. 14, 1939 |
| 2,251,725 | Warren | Aug. 5, 1941 |
| 2,560,453 | Kleist | July 10, 1951 |